United States Patent [19]
Fiorentino et al.

[11] 4,247,796
[45] Jan. 27, 1981

[54] ELECTROSTATIC TRANSDUCER FOR GENERATING STROBE SIGNALS

[75] Inventors: Guido Fiorentino, Ivrea; Lino Sella, Banchette, both of Italy

[73] Assignee: Ing. C. Olivetti & C., S.p.A., Ivrea, Italy

[21] Appl. No.: 24,987

[22] Filed: Mar. 29, 1979

[30] Foreign Application Priority Data

Apr. 3, 1978 [IT] Italy .................. 67719 A/78

[51] Int. Cl.³ .............................................. H02N 1/00
[52] U.S. Cl. ................................. 310/308; 310/309; 310/12; 324/109
[58] Field of Search ................. 310/308, 309, 12; 307/400; 324/109

[56] References Cited

U.S. PATENT DOCUMENTS

| | | | |
|---|---|---|---|
| 2,739,248 | 3/1956 | Meir | 310/309 |
| 3,414,742 | 12/1968 | Fisher et al. | 310/308 |
| 3,629,624 | 12/1971 | Staudte | 310/309 X |
| 3,696,258 | 10/1972 | Anderson et al. | 310/308 |
| 3,971,938 | 7/1976 | O'Hare | 310/308 X |

*Primary Examiner*—Mark O. Budd
*Attorney, Agent, or Firm*—Schuyler, Banner, Birch, McKie & Beckett

[57] ABSTRACT

In a generator of strobe signals an electret is interposed between a fixed and a movable armature moving with a translatory or rotary movement. The strobe signals are generated by the electrostatic induction of the electric charges trapped in the electret according to a selective flux pattern.

12 Claims, 10 Drawing Figures

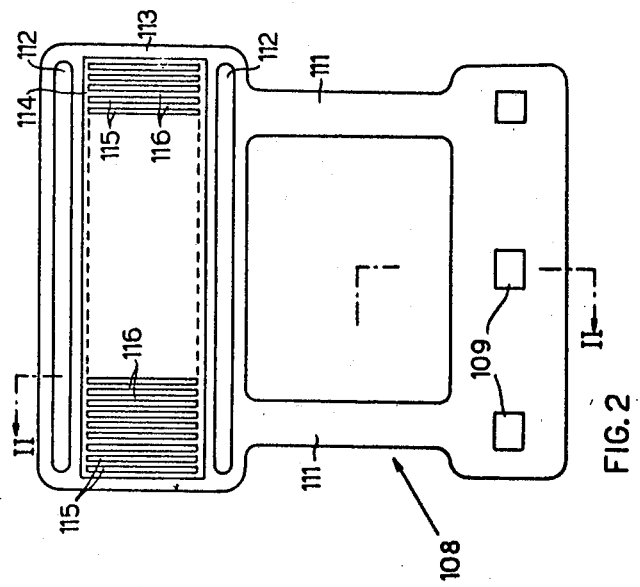
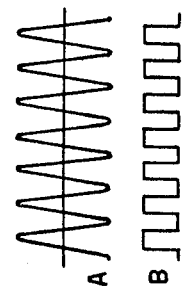
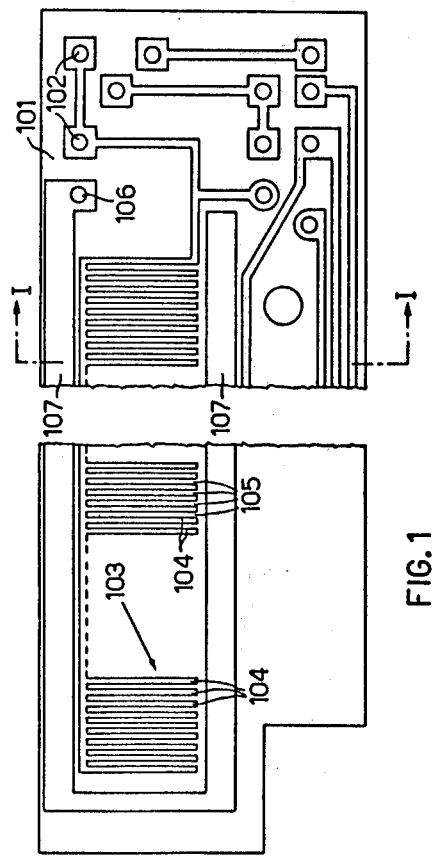
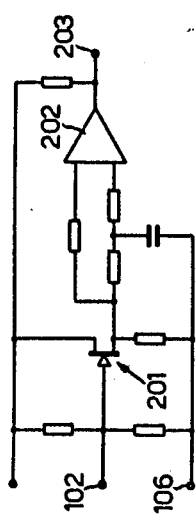
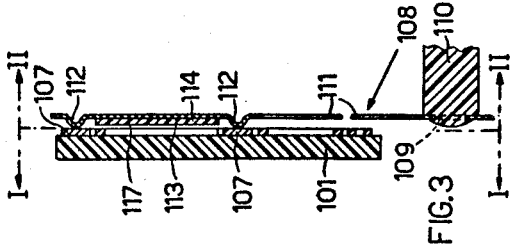

ELECTROSTATIC TRANSDUCER FOR GENERATING STROBE SIGNALS

TEXT OF THE DISCLOSURE

This invention relates to a transducer for generating strobe signals in correspondence of the passing of a member movable with a linear or rotary motion by predetermined points of a plane facing a fixed member.

Generators of strobe signals are widely used for generating clocking pulses in coincidence with the passing of a movable member by preestablished points. The closer are these points, the higher is the required resolutive power.

The most commonly used generators of strobe signals use transducers based on magnetic principles. They include timing wheels shaped out of a magnetic material and magnetic pickups including a permanent magnet material. The magnetic transducers have the disadvantage of a rather low resolutive power and of small induced signals, requiring high gain preamplifiers and squarers to generate usable timing pulses. An increase in the resolutive power imposes very narrow mechanical tolerances, with the timing wheel rotating very close to the magnetic pick up without touching it.

There are also known transducers based on optoelectronic principles, wherein slotted timing wheels selectively intercept the light beam directed to a photosensitive device. The disadvantages of the optoelectronic transducers is that, particularly when a high resolutive power is required, they must use sophisticated optical systems to obtain very narrow light beams, while at the same time the amplitude of the generated signals is very low, requiring a strong amplification, because of the small quantity of light passing through the slotted timing wheel.

The disadvantages of the transducers of known type are even more serious for the transducers of linear type, because of particular problems of precision, dimensions and cost.

On the other hand there are known dielectric materials usually called "electrets", polarized in a permanent way, which are already in use for electro mechanical transducers which comprise members movable one with respect to the other in the same direction as the polarization of the electret, such as microphones, loudspeakers and keyboards.

The technical problem that the invention intends to solve is a generator of strobe signals of low cost, endowed with a high resolutive power.

The technical problem has been solved by the transducer according to the invention, which is characterized by at least a pair of opposite conductive surfaces substantially parallel to the plane of the motion, at least one of said surfaces being secured to one of said members, electret means permanently polarized in a direction perpendicular to said motion and secured to one of said conductive surfaces, and means associated with said movable member for causing said electret means to intermittently cooperate with the other conductive surface to generate said strobe signals.

This and further features of the invention will become evident from the disclosure of some preferred embodiments of the invention, made by way of example in conjunction with the accompanying drawing, wherein:

FIG. 1 is a front view of one preferred embodiment of a transducer according to the invention;

FIG. 2 is a detail of the transducer of FIG. 1;

FIG. 3 is a cross section of the transducer of FIGS. 1 and 2;

FIG. 9 is a diagram of a circuit for using the transducer according to the invention;

FIG. 10 is a diagram relative to the waveshapes of the generated strobe signals according to the invention.

The invention can be embodied on transducers for the generation of strobe signals both for linear (FIGS. 1, 2 and 3), and rotary (FIGS. 4, 5, 6, 7 and 8) relative movement of two members.

Figure 6:
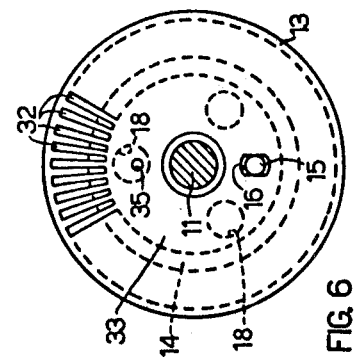
FIG. 6 is another view of the transducer taken according to the line VI—VI of FIG. 4.
Figure 8:
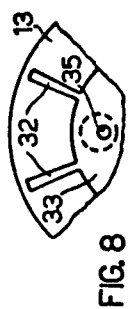
FIG. 8 is another detail of the variant of FIG. 7.
Figure 4:
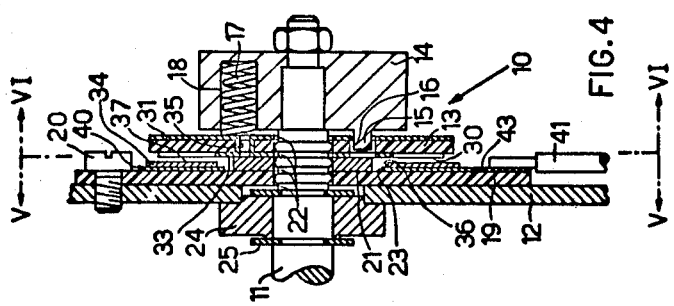
FIG. 4 is an axial cross section of another embodiment of the invention.
Figure 7:
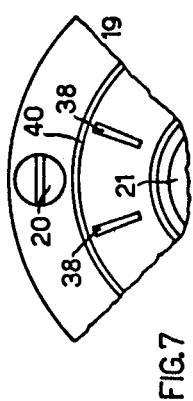
FIG. 7 is a detail of a variant to the transducer of FIG. 4.
Figure 5:
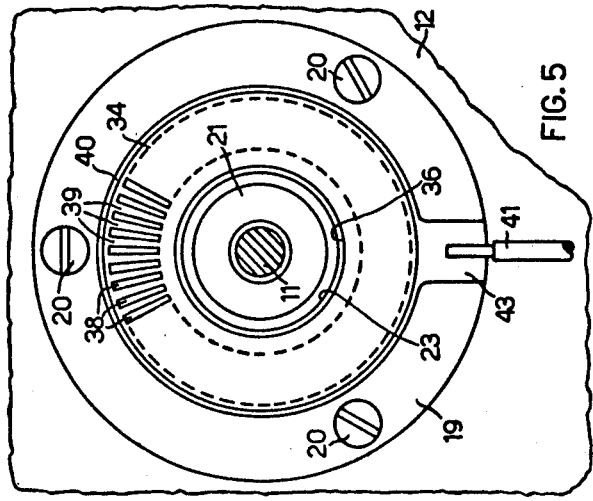
FIG. 5 is a view of the transducer taken according to the line V—V of FIG. 4.

The rotary transducers in common use are required to generate a series of strobe pulses in correspondence with the passing of a shaft through a number of regularly disposed angular positions. In the embodiment of FIGS. 4, 5 and 6 the transducer according to the invention generates 200 strobe pulses for each revolution of a driving shaft 11. The shaft 11 rotates with respect to a metallic body 12, supporting the transducer. The shaft 11 drives into rotation a coaxial disk 13 formed of a circuit printed on the two faces, through a metallic sleeve 14 with a protruding pin 15 which cooperates with a hole 16 of the disk 13 (FIG. 6).

Three springs 17 are inserted in three corresponding cylindrical seats 18 formed circumferentially equidistant on the sleeve 14 and are provided for pushing the disk 13 toward a fixed disk 19 coaxial with the shaft 11. Secured to the disk 19 is a metallic annular sheet 40 obtained with the technology of the printed circuits on one face of the disk 19, which is fastened to the body 12 by means of screws 20. The annular sheet 40 is provided with an internal hole 23 and is insulated with respect to the body 12. The sheet 40 is also provided with an extension 43, to which a conductor 41 is permanently connected for picking up the generated strobe signals.

Between the two disks 13 and 19 a perfectly flat metallic spacing washer 21 is interposed. The shaft 11 is provided with two grooves 22 having the center planes aligned with the contacting surfaces of the washer 21 with the disks 13 and 19. Two other grooves 22 of the shaft 11 are provided in correspondence with the surfaces of the disks 13 and 19 not contacted by the washer 21, whereby a small oscillation of the disks and of the washer with respect to the shaft is allowed. In this way the disk 13 adapts to the orientation imposed by the washer 21, remaining parallel in every position of its rotation to the fixed disk 19, independently of any possible error of perpendicularity of the shaft 11 with respect to the body 12.

The shaft 11 rotates on bronze bearings 24. A collar 25 acts as a thrust bearing for the axial thrust produced by the springs 17.

With a precise process of photoetching, 200 conducting spokes or conductors 32 (FIG. 6) are obtained on the face 30 of the printed circuit of the movable disk 13 directed towards the fixed disk 19 (FIG. 6). The spokes 32 are angularly equidistant with a predetermined pitch and are interconnected by a conducting ring 33. The other face 31 of the movable disk 13, not etched, is connected to the face 30 by a connection 35 (FIG. 4) crossing the disk 13. The springs 17 bear against the face 30, so that through said springs, the sleeve 14, the shaft 11 and the bearing 24 the spokes 32 of the movable disk 13 are brought to the same electric potential as the body 12 (FIG. 6).

An annular sheet or disk of electret 34 (FIGS. 4 and 5) is bonded or glued on the metallic sheet 40 of the dish 19. The disk of electret 34 is formed of permanently polarizable material known per se, which however is selectively polarized perpendicularly to the surface of the disk 34, as to create a flux pattern corresponding to that of the 200 spokes of the printed circuit of the face 30 of the movable disk 13 (FIG. 6).

The disk of electret 34 of the example is of fluorine-ethyl-propylene, commercially known as FEP, registered Trademark of the firm DuPont, cut out of a sheet 1 mil thick (25 microns). The electret disk 34 is concentric with the shaft 11, and has an internal hole 36 of a diameter slightly larger than the diameter of the distancing washer 21. Said washer is 0.2 mm thick the printed circuits constituting the annular sheet 40 of the fixed disk 19 and the spokes 32 of the movable are made of copper 0.05 mm thick, so that the surface 37 of the disk of electret 34 is located at a distance of 0.075 mm from the spokes 32 of the movable disk 13.

A preferred method for obtaining a selective polarization of the disk of electret 34 consist in using a sheet of electret uniformly polarized with the known techniques, and selectively metallizing its surface 37 according to rectangular areas or spokes 38 (FIG. 5) angularly equidistant with a pitch equal to that of the spokes 32, by vacuum deposition of an alluminium layer of a few Angstrom through a mask reproducing a pattern with spokes 38 (FIG. 5), corresponding to that of the movable disk 13 of FIG. 6. The embedded charges under the metallized surface 37 are shielded by the metallization, so that the flux pattern of the disk of electret 34 is limited to the non metallized areas or spokes 39. Another preferred method consists in selectively polarizing an unpolarized sheet of electret by means of corona discharge or electron bombardment, through a mask whose openings correspond to the required selective flux pattern of the electret.

An alternative method consist in the selective cancelling of the charges of an uniformly polarized electret by means of selective heating, for instance bringing the areas in which it is desired to cancel the charges in contact with a tool reproducing the pattern of the metallized areas 38 of FIG. 5 heated to a temperature of about 300° C. Other possible methods are based on the use of an electret sheet from which are punched out the areas corresponding to the metallized areas 38, or of separate strips of electret substituting the spokes 32 of the disk of electret 34.

It is evident that with all these methods electric charges intermittently interpose between the conducting spokes 32 (FIG. 6) of the movable disk 13 and the sheet 40 of the fixed disk 19, so that the rotation of the movable disk 13 causes an electrostatic induction variable with the variation in the facing of the spokes 32 of the movable disk 13 with the polarized spokes 39 of the disk of electret 34 (FIG. 5).

As a consequence a periodically variable electrostatic voltage is induced on the ring 40 of the fixed disk 19 under the disk of electret 34, with a frequency of 200 full waves per turn of the shaft 11, as many as the times per revolution that the spokes 32 of the movable disk 13 are aligned with the non metallized spokes 39 of the disk of electret 34. The generated voltage results from the summing up of all voltages simultaneously generated by the electrostatic induction of the various spokes 32 by the spokes 38 on the sheet 40 and has the shape of a triangular wave with slightly rounded points, corresponding to the periodic increase and decrease of the facing of the spokes 32 of the movable disk 13 with the spokes 39 of the disk of electret 34.

In one example the generated voltage has an amplitude of 5 volts peak to peak at a velocity of rotation of the shaft 11 of 1000 RPM, with a frequency of 3.3 KHz. Because of its quite large amplitude, such strobe signal normally does not need amplification. If a square strobe signal is desired (B FIG. 10) a very simple squaring circuit, such as the one indicated in FIG. 9 can be used, in which the FET preamplifier 201 and amplifier 202 are inexpensive commercial semiconductors.

To the disclosed example it is possible to introduce a number of modifications without departing from the scope of the invention. It is possible for instance to exchange the position of the disk of electret 34 and of the spokes of the printed circuit of the movable disk 13, thus having a rotating disk of electret and fixed printed circuit spokes, or even to use an electrostatic shield with conductive spokes rotating between a fixed selectively charged electret and an uniformly conductive armature. It is possible to use different numbers of spokes for the printed circuit and the disk of electret; in particular it is possible to have only one spoke, or a limited number of spokes on the disk of electret 34, and a number of spokes in different angular positions on the printed circuit, or vice versa, when it is desired to generate strobe signals in not regularly disposed angular positions of the rotation of the shaft 11.

It is also possible to use regularly spaced spokes in different number for the disk of electret 34 and for the printed circuit, in order to increase the number of strobe pulses per turn of the shaft 11 without being obliged to multiply the number of the spokes. If in fact if the numbers of the regularly disposed spokes, respectively N and M, are prime numbers, the generated strobe signal has a frequency of N times M pulses per turn. This solution is illustrated as an example in FIG. 7 and 8, where N=8, M=9, generating 72 strobe pulses per turn.

The operation of the rotary transducer of FIGS. 4, 5 and 6 is similar to the operation of the linear transducer of FIGS. 1, 2 and 3, whose simplicity and reduced dimensions are particularly evident with respect to the linear transducers of known type.

FIG. 1 shows the fixed member 101 of the linear transducer, which is formed of a printed circuit board carrying also the amplifying circuit of FIG. 9 and other circuits of the apparatus in which the transducer is used. The strobe signals are available on terminals 102, electrically connected to a printed circuit comb 103 in which conductive strips 104 alternate with insulating strips 105.

The other end of the strobe circuit of FIG. 9 corresponds to a terminal 106 of the printed circuit board 101 which is connected to two conductive strips 107 situated on both sides of the comb 103.

The movable member of the linear transducer is a slider 108 (FIG. 2), punched out of a bronze sheet 0.3 mm thick, with two flexible arms 111 and two protruding portions or drawn sliders 112 (FIGS. 2 and 3) protruding 0.1 mm. The slider 108 is fastened through square holes 109 to the member whose linear displacement has to be strobed.

The flexible arms 111 are preloaded, so that the sliders 112 exert a slight pressure against the conductive strips 107 on which they slide, insuring an electrical contact between the slider 108 and the printed board terminal 106 and at the same time keeping a face 113 of the runner 108 (FIG. 3) precisely at a distance of 0.1 mm with respect to the conductive strips 104 of the comb 103.

A rectangular sheet of electret material 114 is glued onto the face 113 of the slider 108 (FIGS. 2 and 3). Said sheet 114 is selectively polarized following the already described technique, alternating metallized strips 115 and non metallized strips 116 (FIG. 2), with the same pitch as the conductive strips 104 and the insulating strips 105 of the comb 103.

The thickness of the sheet 114 is 25 microns, so that its surface 117 is located at a distance of 0.075 mm from the comb 103 (FIG. 3). The displacement of the slider 108 causes the induction of variable electrostatic strobe signals on the terminal 102, exactly as in the case of the rotary transducer. In the example the pitch between the strips 105 of the comb 103 is of 0.6 mm. so that a full wave of strobe signal is generated for every 0.6 mm of displacement.

Because of its simplicity and low cost, the transducers according to the invention are suitable for a large number of applications, for instance for the generation of strobe signals for tabulating devices, for the velocity control of motors, for mileage and speed meters and for spark timing devices of cars.

The characteristics of the generated strobe signals are particularly suited for the requirements of the integrated MOS circuits, most promising for such applications.

What we claim is:

1. A transducer for generating strobe signals in response to a relative movement of a pair of facing members along a predetermined direction, comprising a printed circuit secured to a first one of said members to face the other of said members, said printed circuit being formed with a common conductor parallel to the direction of said relative movement and connected to a plurality of substantially rectangular conductors extending transverse to said direction and indicating a plurality of relative positions of said members,
   a sheet of conductive material secured to said other member to face said printed circuit,
   at least a substantially rectangular electret element secured to said conductive sheet parallel to said conductors and permanently electrostatically polarized to generate a flux pattern perpendicular to said direction, and means for relatively moving said members one with respect to the other in said direction, whereby said conductors intermittently cooperate with the flux pattern of said electret element to generate by electrostatic induction on said sheet strobe signals indicative of said relative positions.

2. A transducer according to claim 1, wherein said conductors are equidistant with a predetermined pitch and wherein a number of substantially rectangular electret elements are equidistantly secured to said conductive sheet with a pitch equal to the pitch of said conductors, said strobe signals being generated by summing up the electrostatic induction of said elements on said sheet, an additional conductor being electrically connected with said sheet for picking up said strobe signals.

3. A transducer according to claim 2, wherein said electret elements are formed from a sheet of electret secured to said sheet of conductive material and selectively polarized to present a number of substantially rectangular polarized areas interspersed with substantially rectangular non polarized areas.

4. A transducer according to claim 3, wherein said first member is stationary and the other member is rectilinearly movable with respect to said first member, said printed circuit also including said auxiliary conductor, said sheet of conductive material including at least a protruding portion for guiding said polarized areas to be moved a predetermined constant distance from said plurality of conductors and being yieldable for causing said protruding portion to slidably contact said auxiliary conductor.

5. A transducer according to claim 3, wherein said other member is stationary, said first member being in form of a disk rotatable with respect to the other member, said sheets being annular, said auxiliary conductor being permanently secured to said sheet of conductive material.

6. A transducer according to claim 5, wherein said disk is angularly secured to a rotatable shaft comprising a washer mounted on said shaft between said disk and said stationary member for guiding said disk to have said polarized areas at a predetermined distance from said plurality of conductors, and urging means for axially urging said disk toward said stationary member.

7. A transducer according to claim 6, wherein said shaft is provided with a pair of grooves having their center place in correspondence of the contacting surfaces of said washer with a corresponding surface of said disk and said stationary member, and a pair of additional grooves in correspondence with the surfaces of said disk and said stationary member opposite to the so contacted surfaces, said urging means including a plurality of compression springs located circumferentially equidistant between said opposite surface of the disk and a hub secured to said shaft.

8. A transducer according to claim 3, wherein said flux pattern is created by selectively polarizing said sheet of electret through the openings of a mask.

9. A transducer according to claim 3, wherein said flux pattern is created on said sheet of electret by selectively cancelling the polarization of an uniformly polarized electret.

10. A transducer as in claim 9, wherein said selective cancelling is effected by selectively metallizing said uniformly polarized electret.

11. Transducer as in claim 9, wherein said selective cancelling is effected by selectively heating said uniformly polarized electret.

12. A transducer according to claim 3, wherein said flux pattern of said sheet of electret is obtained by cutting or punching an uniformly polarized electret.

* * * * *